Figure 1:
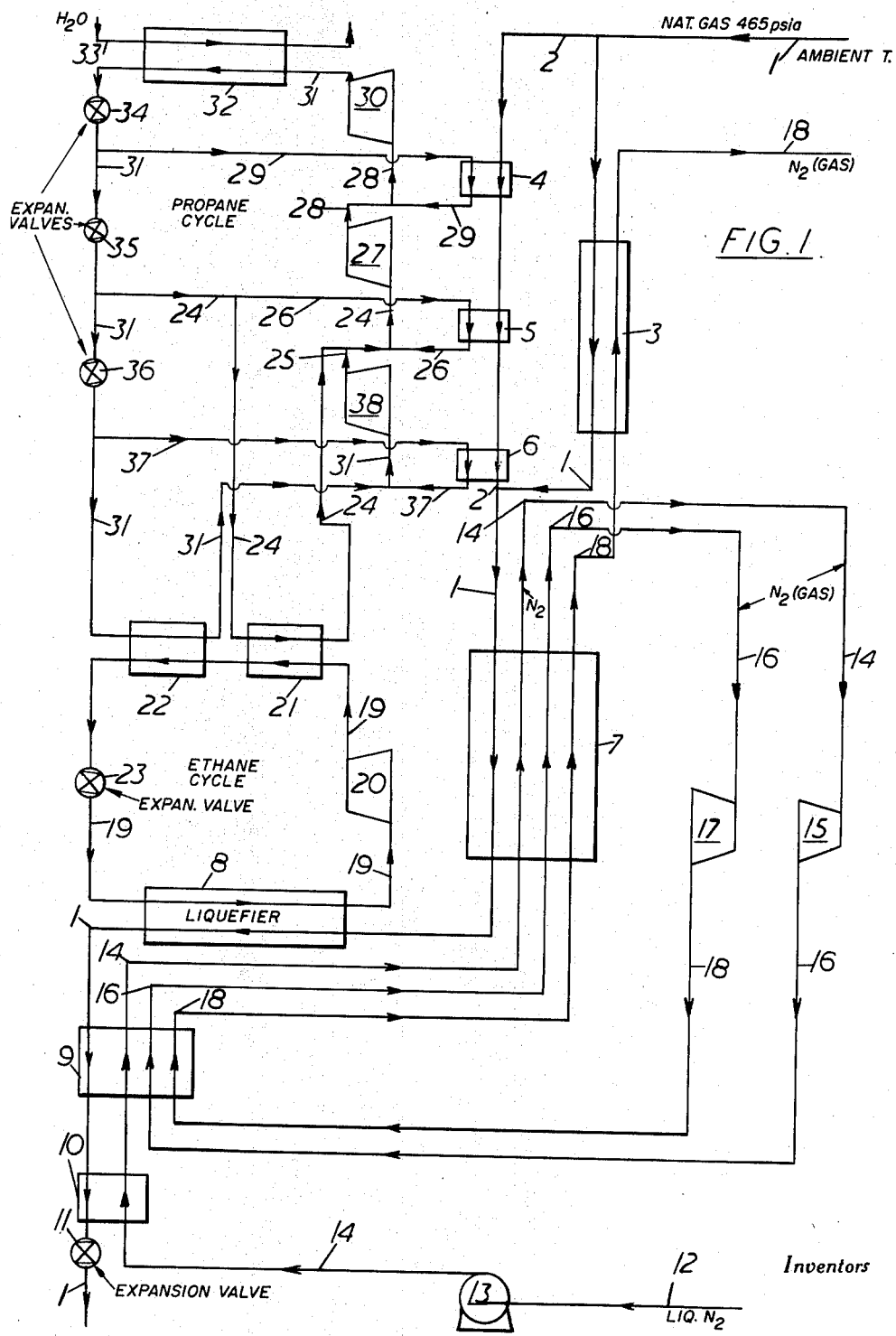

Inventors
Eli Mosche Feist and Hadi Hashemi Tafreshi
Ooms, McDougall & Hersh
Attorney

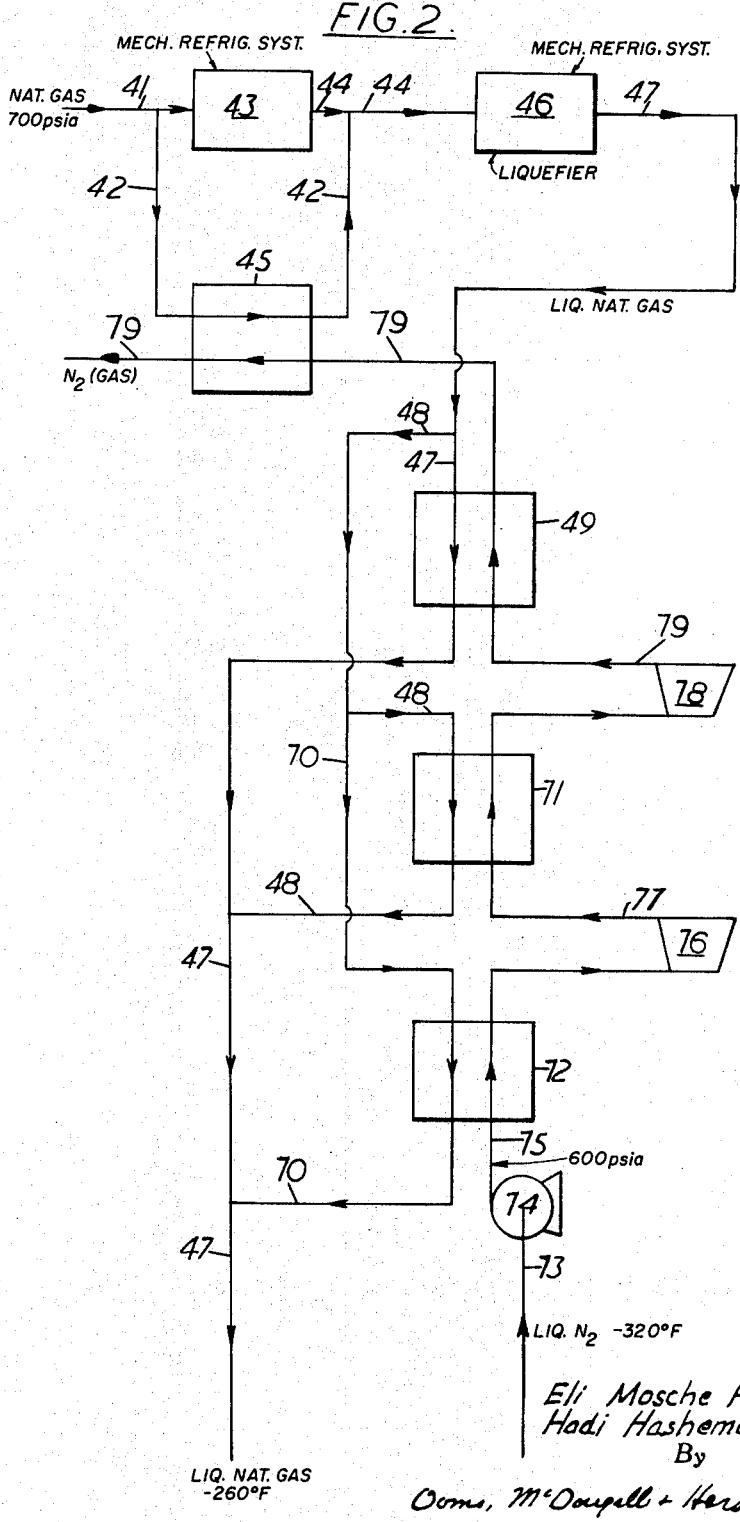

United States Patent Office 3,224,207
Patented Dec. 21, 1965

3,224,207
LIQUEFACTION OF GASES
Eli M. Feist, Haifa, Israel, and Hadi Hashemi-Tafreshi, Norman, Okla., assignors to Conch International Methane Limited, Nassau, Bahamas, a corporation of the Bahamas
Filed Feb. 12, 1962, Ser. No. 172,467
6 Claims. (Cl. 62—9)

This invention concerns a method for liquefying a gas; and it more particularly concerns a method for liquefying methane.

In this specification, references to methane mean pure methane or any mixture of gases containing methane as the major ingredient; for example natural gas.

The invention provides a method for the liquefaction of a gas and subsequent cooling of the liquefied gas, which comprises removing sensible heat from the gas and liquefied gas by indirect heat exchange with a gas expansion refrigeration system, and removing latent heat from the gas by indirect heat exchange with a cascade vapour-compression refrigeration cycle. A "cascade vapour-compression refrigeration cycle" is one in which a plurality of vapour-compression refrigeration cycles are connected in series, each of said cycles, except the first, employing a gas with a lower boiling point than the preceding cycle in the series and the gas in each cycle except the first being liquefied under pressure by the evaporating liquefied gas of the preceding cycle. A "gas expansion refrigeration system" is defined as a refrigeration system in which a compressed gas is expanded to cool the same and the resulting cold gas is passed in heat exchange with the material to be refrigerated.

Although the invention involves using a gas expansion refrigeration system to remove sensible heat and a cascade vapour-compression cycle to remove latent heat, it is useful under some circumstances to remove some sensible heat from the gas to be liquefied by indirect heat exchange with the cascade vapour-compression cycle.

In applying the invention to the liquefaction of methane, nitrogen is preferably used as refrigerant in the gas expansion refrigeration system, and ethane, propane and water are preferably used as refrigerants in the cascade vapour-compression refrigeration cycle. However, ammonia can replace the propane and ethylene or a Freon can be used in place of ethane. When propane or ammonia is used as a refrigerant in said cascade vapour-compression refrigeration cycle, some sensible heat can be removed from the gas to be liquefied by indirect heat exchange with the propane or ammonia. When ethane or ethylene is used as a refrigerant in said cascade vapour-compression cycle, some sensible heat can be removed from the gas to be liquefied by indirect heat exchange with the ethane or ethylene, and all of the latent heat in the gas to be liquefied can be removed by indirect heat exchange with the ethane or ethylene.

The invention is particularly useful in the liquefaction of methane, but it can be used to liquefy other gases, such as ethane, ethylene, nitrogen, oxygen and air. The invention is particularly applicable to the liquefaction of methane when liquid nitrogen is available.

In the accompanying drawings,
FIGURE 1 illustrates a flow-sheet of a refrigeration plant utilizing the concepts of this invention; and,
FIGURE 2 illustrates a flow-sheet of a refrigeration plant utilizing a modified form of the invention.

The invention is now illustrated by the following examples, in which reference is made to the accompanying drawings.

*Example I*

In this example, reference is made to FIGURE 1 of the accompanying drawings, which is a flow-sheet of a refrigeration plant applying the invention.

Gaseous natural gas under a pressure of 465 p.s.i.a. and at ambient temperature enters the plant via conduit 1; and a part thereof passes into conduit 2. The remainder of the natural gas in conduit 1 passes through heat exchanger 3, in which it is cooled to $-50°$ F. by indirect heat exchange with gaseous nitrogen as hereinafter described. After being so cooled, gaseous natural gas in conduit 1 mixes with gaseous natural gas from conduit 2 that has been cooled to $-50°$ F. by indirect heat exchange with evaporating liquid propane in heat exchangers 4, 5 and 6 as hereinafter described. The resultant cooled gaseous natural gas passes through heat exchanger 7, in which it is further cooled to $-134°$ F. by indirect heat exchange with nitrogen as hereinafter described. Cooled natural gas then passes through heat exchanger 8, in which it is further cooled to $-138°$ F. by indirect heat exchange with evaporating liquid ethane as hereinafter described, and is thereby liquefied. Liquid natural gas passes through heat exchangers 9 and 10, in which it is cooled to $-206°$ F. and $-259°$ F. respectively. The cooled liquid natural gas passes through expansion valve 11, whereby the pressure on it is reduced to atmospheric pressure. Liquid natural gas obtained is taken off as product.

In the above procedure, heat exchangers 3, 7, 9 and 10 form part of a gas expansion refrigeration system, and heat exchangers 4, 5, 6 and 8 form part of a cascade vapour-compression refrigeration cycle. Heat exchangers 3, 4, 5, 6 and 7 remove sensible heat from gaseous natural gas in conduits 1 and 2; heat exchanger 8 removes some sensible heat and all the latent heat from gaseous natural gas in conduit 1; and heat exchangers 9 and 10 remove sensible heat from liquid natural gas.

In the gas expansion refrigeration system containing heat exchangers 3, 7, 9 and 10, liquid nitrogen enters said system via conduit 12, and is pumped under a pressure of 1,500 p.s.i.a. and at a temperature of $-321°$ F. into conduit 14 by pump 13. The nitrogen in conduit 14 passes through heat exchangers 10, 9 and 7, in which it cools liquid and gaseous natural gas in conduit 1 as hereinbefore described. The nitrogen produces temperatures of $-321°$ F., $-211°$ F. and $-143°$ F. respectively at the inlet of each of said heat exchangers, and temperatures of $-211°$ F., $-143°$ F. and $-55°$ F. respectively, at the outlet of each of said heat exchangers.

Nitrogen leaves heat exchanger 7 in conduit 14 under a pressure of 1,500 p.s.i.a. and at a temperature of $-55°$ F. and passes into expansion turbine 15, in which the pressure on it is reduced to 150 p.s.i.a., thereby reducing its temperature to $-211°$ F. Nitrogen leaves expansion turbine 15 via conduit 16 and passes through heat exchangers 9 and 7, in which it cools liquid and gaseous natural gas in conduit 1 as hereinbefore described. The nitrogen produces temperatures of $-211°$ F. and $-143°$ F. respectively at the inlet of said heat exchangers, and temperatures of $-143°$ F. and $-55°$ F. respectively at the outlet of said heat exchangers.

Nitrogen leaves heat exchanger 7 in conduit 16 under a pressure of 150 p.s.i.a. and at a temperature of $-55°$ F. and passes into expansion turbine 17, in which the pressure on it is reduced to atmospheric pressure, thereby reducing its temperature to $-211°$ F. Nitrogen leaves expansion turbine 17 via conduit 18, and passes through heat exchangers 9 and 7, in which it cools liquid and gaseous natural gas in conduit 1 as hereinbefore described. The nitrogen produced temperatures of $-211°$ F. and $-143°$ F. respectively at the inlet of said heat exchangers, and temperatures of —143° F. and —55° F. respectively at the outlet of said heat exchangers.

Gaseous nitrogen leaves heat exchanger 7 in conduit 18 under atmospheric pressure and at a temperature of —55° F., and passes through heat exchanger 3, in which it cools gaseous natural gas in conduit 1 as hereinbefore described, and is exhausted from the system. The gaseous nitrogen produces a temperature of —55° F. and a temperature of 55° F. respectively at the inlet and outlet of heat exchanger 3.

In the cascade vapour-compression refrigeration cycle containing heat exchangers 4, 5, 6 and 8, ethane vapor at —143° F. leaves exchanger 8 in conduit 19, and enters compressor 20, in which it is compressed to a pressure of 56 p.s.i.a. Compressed gaseous ethane passes from compressor 20 into conduit 19, and through heat exchangers 21 and 22, in which it is cooled to —75° F. by indirect heat exchange with evaporating liquid propane as hereinafter described, and thereby liquefied. Liquid ethane at a temperature of —75° F. in conduit 19 passes through expansion valve 23, whereby the pressure on it and its temperature are reduced to 9 p.s.i.a. and —143° F. respectively. Cooled liquid ethane in conduit 19 then evaporates in heat exchanger 8, in which it cools and liquefies gaseous natural gas in conduit 1 as hereinbefore described.

Propane vapor at —30° F. leaves heat exchanger 21 in conduit 24, and, together with propane from conduit 25 and from conduit 26 as hereinafter described, enters compressor 27, in which the propane is compressed to a pressure of 57 p.s.i.a. Compressed gaseous propane passes from compressor 27 into conduit 28, and, together with propane from conduit 29 as hereinafter described, enters compressor 30, in which the propane is compressed to a pressure of 112 p.s.i.a. Compressed gaseous propane passes from compressor 30 into conduit 31, and through heat exchanger 32, in which it is liquefied by indirect heat exchange with water in conduit 33 at a temperature of 60° F. Liquid propane in conduit 31 passes through expansion valve 34, whereby the pressure on it and its temperature are reduced to 57 p.s.i.a. and 20° F. respectively. A part of the resultant liquid propane in conduit 31, and the flash vapour, passes into conduit 29, and through heat exchanger 4, in which it evaporates and cools gaseous natural gas in conduit 2 as hereinbefore described, into conduit 28 as hereinbefore described. The remainder of the liquid propane on conduit 31 passes through expansion valve 35, whereby the pressure on it and its temperature are reduced to 21 p.s.i.a. and —30° F. respectively. A part of the resultant liquid propane and flash vapour in conduit 31 passes into conduit 24, and some of this part of the resultant liquid propane passes into conduit 26, and through heat exchanger 5, in which it evaporates and cools gaseous natural gas in conduit 2 as hereinbefore described, into conduit 24, in which it mixes with propane vapour as hereinbefore described. The remainder of the liquid propane in conduit 24 exaporates in heat exchanger 21, in which it cools and liquefies compressed gaseous ethane in conduit 19 as hereinbefore described. The remainder of the liquid propane in conduit 31 passes through expansion valve 36, whereby the pressure on it and its temperature are reduced to 6 p.s.i.a. and —80° F. respectively. A part of the resultant liquid propane and flash vapour passes into conduit 37, and through heat exchanger 6, in which it evaporates and cools gaseous natural gas in conduit 2 as hereinbefore described, into conduit 31 as hereinafter described. The remainder of the liquid propane in conduit 31 evaporates in heat exchanger 22, in which it cools and liquefies compressed gaseous ethane in conduit 19 as hereinbefore described. Propane vapor at —80° F. leaves heat exchanger 22, and, together with propane from conduit 37 as hereinbefore described, enters compressor 38, in which it is compressed to 21 p.s.i.a. Compressed gaseous propane passes from compressor 38 into conduit 25, and thence into conduit 24 as hereinbefore described.

In the above procedure, power generated by expansion turbines 15 and 17 is used to drive compressors 20, 27, 30 and 38.

*Example II*

In this example, reference is made to FIGURE 2 of the accompanying drawing, which is a flow-sheet of a refrigeration plant applying the invention.

Gaseous natural gas under a presure of 700 p.s.i.a. and at ambient temperature enters the plant via conduit 41 and a part thereof passes into conduit 42. The remainder of the gaseous natural gas in conduit 41 passes through mechanical refgrigeration system 43, and is thereby cooled to —100° F. Cooled gaseous natural gas passes from mechanical refrigeration system 43 into conduit 44, mixes with gaseous natural gas from conduit 42 that has been cooled to —100° F. by indirect heat exchange with gaseous nitrogen in heat exchanger 45 as hereinafter described, and passes through mechanical refrigeration system 46, and is thereby cooled to —130° F. and liquefied.

Liquid natural gas at a temperature of —130° F. passes from mechanical refrigeration system 46 into conduit 47, and a part thereof passes into conduit 48. The remainder of the liquid natural gas in conduit 47 passes through heat exchanger 49, in which it is cooled to —230° F. by indirect heat exchange with nitrogen as hereinafter described, mixes with liquid natural gas from conduits 48 and 70 as hereinafter described, and is taken off as product. A part of the liquid natural gas that enters conduit 48 passes into conduit 70, and the remainder thereof in conduit 48 passes through heat exchanger 71, in which it is cooled to —260° F. by indirect heat exchange with nitrogen as hereinafter described, and enters conduit 47 as hereinbefore described. The liquid natural gas that enters conduit 70 passes through heat exchanger 72, in which it is cooled to —260° F. by indirect heat exchange with liquid nitrogen as hereinafter described, and enters conduit 47 as hereinbefore described.

In the above-mentioned procedure, mechanical refrigeration systems 43 and 46 each apply a cascade vapour-compression refrigeration cycle employing water, propane and ethane as refrigerants; and heat exchangers 45, 49, 71, and 72 form part of a gas expansion refrigeration system. Mechanical refrigeration system 43 and heat exchanger 45 remove sensible heat from gaseous natural gas; mechanical refrigeration system 46 removes some sensible heat and all the latent heat from gaseous natural gas; and heat exchangers 49, 71 and 72 remove sensible heat from liquid natural gas.

The cooling produced by heat exchangers 49, 71 and 72 is obtained in the following manner. Liquid nitrogen enters the system via conduit 73, and is pumped under a pressure of 600 p.s.i.a. and at a temperature of —320° F. into conduit 75 by pump 74. Liquid nitrogen in conduit 75 passes through heat exchanger 72, in which it cools liquid natural gas in conduit 70 as hereinbefore described, and the resulting gaseous nitrogen passes into expansion turbine 76 at a temperature of —140° F., in which the pressure on it is reduced to 80 p.s.i.a., thereby reducing its temperature to —266° F. Nitrogen passes from expansion turbine 76 into conduit 77, and through heat exchanger 71, in which it cools liquid natural gas in conduit 48 as hereinbefore described, into expansion turbine 78 at a temperature of —140° F., in which the pressure on it is reduced to 15 p.s.i.a., thereby reducing its temperature to —240° F. Nitrogen passes from expansion turbine 78 into conduit 79 as hereinbefore described. Gaseous nitrogen at a temperature of —140° F. leaves heat exchanger 49 in conduit 79, passes through heat exchanger 45, in which it cools gaseous natural gas in conduit 42 as hereinbefore described, and is exhausted from the system.

In the above procedure, power generated by expansion turbines 76 and 78 is used to drive the compressors in the mechanical refrigeration systems 43 and 44.

We claim:

1. A method for the liquefaction of methane and subsequent cooling of the liquefied methane, which comprises removing sensible heat from the gaseous methane and liquefied methane by indirect heat exchange with a nitrogen expansion refrigeration system and removing latent heat from the methane by indirect heat exchange with a cascade vapour-compression refrigeration cycle, in which ethane, propane and water are used as refrigerants in the cascade vapour-compression refrigeration cycle.

2. A method as claimed in claim 1, in which some sensible heat is removed from the gaseous methane by indirect heat exchange with the propane in the cascade vapour-compression refrigeration cycle.

3. A method for the liquefaction of methane and subsequent cooling of the liquefied methane, which comprises removing sensible heat from the gaseous methane and liquefied methane by indirect heat exchange with a nitrogen expansion refrigeration system and removing latent heat from the methane by indirect heat exchange with a cascade vapour-compression refrigeration cycle, in which a final cooling of the liquefied methane is accomplished by indirect heat exchange with liquid nitrogen.

4. A method as claimed in claim 1 in which ethylene is used in place of ethane.

5. A method as claimed in claim 1 in which a Freon is used in place of ethane.

6. A method as claimed in claim 1 in which ammonia is used in place of propane.

References Cited by the Examiner

UNITED STATES PATENTS

| | | | |
|---|---|---|---|
| 2,082,189 | 6/1937 | Twomey | 62—40 XR |
| 2,134,702 | 11/1938 | Brewster | 62—40 XR |
| 2,495,549 | 1/1950 | Roberts | 62—40 XR |
| 2,500,118 | 3/1950 | Cooper | 62—40 XR |
| 2,556,850 | 6/1951 | Ogerzaly | 62—40 XR |
| 2,823,523 | 2/1958 | Eakin | 62—40 XR |
| 2,896,414 | 7/1959 | Tung | 62—9 |
| 3,020,723 | 2/1962 | De Luvy | 62—40 XR |
| 3,066,492 | 11/1962 | Grunberg | 62—40 XR |

FOREIGN PATENTS

| | | |
|---|---|---|
| 804,944 | 11/1958 | Great Britain. |
| 860,723 | 2/1961 | Great Britain. |

NORMAN YUDKOFF, *Primary Examiner.*

ROBERT A. O'LEARY, *Examiner.*